Patented Apr. 10, 1951

2,548,845

UNITED STATES PATENT OFFICE 2,548,845

4-HYDROXY-2-ALKYLBENZIMIDAZOLES AS AZO COUPLING COMPONENTS IN DIAZOTYPES

Fred W. Neumann, Nazareth, Pa., assignor to General Aniline & Film Corporation, New York, N. Y., a corporation of Delaware No Drawing. Application December 16, 1948, Serial No. 65,723

4 Claims. (Cl. 95—6)

This invention relates to two-component diazotype photoprinting material.

In two-component diazotype photoprinting material, a light sensitive layer is provided, generally on a support or base such as paper, films, plastic materials, textiles, metals, ceramics such as glass and the like, said layer containing an azo coupling component and a light sensitive diazo compound which is destroyed or modified by exposure to light so as to render it incapable of reacting with the azo coupling component to form a coloration. The aforesaid sensitizing components are stabilized against coupling prior to exposure and subsequent development. After exposing the light sensitive layer to light of locally varied intensity in accordance with an original pattern or design to be reproduced, as by exposure to light under a line drawing or a photographic diapositive, development is effected by causing the residual diazo compound to couple with the azo coupling component, e. g. by treatment with an alkaline developing agent. Such development can be effected advantageously by exposing the diazotype layer to an alkaline vapor such as ammonia or the vapor of a volatile nitrogen base. Alternatively, development can be effected by treatment with alkaline solutions, such as aqueous solutions of ammonia, triethanolamine, sodium carbonate or sodium triphosphate.

Combinations of light sensitive diazo compounds with azo coupling components are often subject to one or more disadvantages. For example, they tend to become discolored during storage, especially from premature coupling or darkening of the sensitizing components. Many coupling components yield copies having an image of insufficient color depth, or insufficient fastness to light, washing, and the effects of the atmosphere. Some compositions tend to become discolored after development, by the effects of light and atmosphere, resulting in darkening of the background of the print. Often, coupling components, otherwise suitable, lack adequate water-solubility to permit their application to a base in an aqueous sensitizing solution.

It is an object of this invention to provide two-component diazotype photoprinting material and sensitizing compositions which avoid all of the aforesaid disadvantages in that they are stable against discoloration in storage, yield prints in which the image has a dense brilliant coloration, fast to light and washing, and in which the background has no substantial tendency to become discolored on exposure to light and atmosphere. Moreover, it is an object to provide sensitizing compositions which can be readily applied in aqueous solution.

In accordance with my invention, photoprinting material having the aforesaid advantages is obtained by providing a light sensitive layer containing as its azo coupling component, 4-hydroxybenzimidazole or alkyl derivatives thereof wherein the alkyl group occupies the 2-position and contains 1–3 carbon atoms, in the form of the free base or a salt thereof, together with a light sensitive diazo compound, preferably a diazotized compound of the paraphenylene diamine series, particularly those having a substituent in one of the amino groups. The aforesaid coupling components have the following formulae:

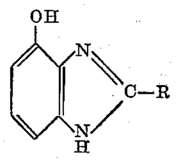

or

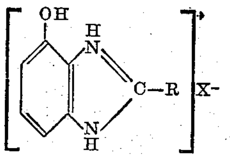

wherein R represents H, $CH_3$, $C_2H_5$, or $C_3H_7$ and $X^-$ represents the anion of a salt forming acid, e. g. Cl, Br, $So_4H$.

In preparing the diazotype photoprinting material of my invention, the aforesaid 4-hydroxybenzimidazole or 2-alkyl derivative thereof is dissolved, advantageously in the form of a mineral acid salt thereof such as the hydrochloride, in an aqueous solution containing a light sensitive diazo compound of the type above referred to, together with the usual stabilizing ingredients, buffers, wetting agents, anti-oxidants, and other components commonly employed in two-component diazo sensitizing compositions. The solution can then be applied to a base such as paper, cloth, metal, glass, films or the like, and allowed to dry. When plastic materials such as cellulose acetate foils are sensitized in accordance with the invention, the coupling component is advantageously employed in the form of the free base, and a water miscible organic swelling agent can be included in the solution to insure dissolution of the benzimidazole compound and penetration of the plastic base.

Upon exposure to light of locally varied intensity, as by exposure to light under an opaque line drawing having a translucent background, or a photographic diapositive, the material is developed by an alkaline vapor such as ammonia. The image thereby produced with the preferred class of diazo compounds has a dark maroon shade, showing excellent fastness to light and washing as well as to background discoloration upon exposure to the light and the atmosphere. The original photoprinting material likewise possesses outstanding stability against premature coupling or discoloration.

Preparation of diazotype sensitizing compositions, of photoprinting material and copies in accordance with a preferred embodiment of my invention are illustrated in the following example:

*Example*

4-hydroxy-2-methylbenzimidazole is prepared by reducing 2,3-dinitroanisole at room temperature (20–30° C.) in ethanol solution with hydrogen, employing a platinum oxide catalyst to the corresponding 2,3-diaminoanisole; recovering the latter in the form of its hydrochloride by crystallization from dilute aqueous ethanol and hydrochloric acid; heating the hydrochloride with acetic anhydride at boiling temperatures under reflux for 45 minutes; and then adding concentrated hydrobromic acid and refluxing for 4 hours. The product is converted to the hydrochloride and purified by evaporating the reaction mixture to dryness and recrystallizing the residue from a mixture of ethanol and hydrochloric acid.

A sensitizing composition was prepared by dissolving the following ingredients in water sufficient to yield a volume of 100 cc.:

1 cc. isopropanol
5 cc. ethylene glycol
5 gs. citric acid
5 gs. zinc chloride
5 gs. thiourea
0.1 g. saponin
2 gs. p-diethylamino benzene diazonium chloride zinc chloride double salt
2 gs. 2-methyl - 4 - hydroxybenzimidazole hydrochloride prepared as described above.

The resulting solution was coated on paper weighing 20½ pounds per ream, and the coated paper was dried. The resulting photoprinting material was exposed to light under a translucent original bearing an opaque design to be reproduced. The exposed sheet was developed by treatment with ammonia vapor. A vivid maroon print was thus obtained of high color density.

For purposes of comparison, control samples were prepared by sensitizing paper with a composition similar to that described in the above example, except that instead of the 4-hydroxy-2-methylbenzimidazole hydrochloride, an equivalent amount of 1-phenyl-3-methyl-5-pyrazolone and of 8-hydroxy-1,2-naphthimidazole were respectively employed. In another control sample, resorcinol was used as the coupler instead of 4-hydroxy-2-methylbenzimidazole.

The unexposed control samples, as well as the paper produced in the foregoing example, were tested for stability (premature coupling and "shelf-life") by subjecting them to accelerated ageing at 50° C. with a relative humidity of 80%, and at 80° C. in a dry atmosphere for 4–6 hours. Other control samples were exposed and developed as described in the example, and tested together with the print obtained in the example for light fastness and stability to yellowing under actinic light by exposure in a fadeometer for three hours, and for fastness to washing by dipping in water.

It was found that the color intensity and stability to yellowing under actinic light of the print obtained in the example was definitely superior to that of the copy obtained with 8-hydroxy-1,2-naphthimidazole, while the fastness to washing and fading of the image was equal or superior. The stability of the print against yellowing of the background was considerably better than the control sample containing phenylmethyl pyrazolone as the azo coupler. The stability of the sensitized paper to discoloration prior to exposure and development was similar or superior to that of the control sample containing resorcinol, an azo coupling component widely employed in comercial products, and definitely superior to the control sample containing phenylmethyl pyrazolone. The hydrochloride of the benzimidazole employed in the example is soluble in concentrations of 2% in aqueous solutions, constituting adequate solubility for use in aqueous sensitizing compositions. The sensitizing compositions and diazotype materials containing the new coupling component of this invention are accordingly equal or superior to related types of compositions heretofore known in the prior art.

Instead of 2-methyl-4-hydroxybenzimidazole hydrochloride, employed as a coupler in the foregoing example, corresponding 4-hydroxybenzimidazoles can be employed, wherein the 2-position of the benzimidazole ring is occupied by hydrogen, ethyl, propyl, or isopropyl radicals, and wherein other salt forming non-oxidizing acids such as sulfuric acid, hydrobromic acid, and the like can replace hydrochloric acid. Similarly advantageous results are obtained, like those described in the foregoing example. These compounds can be prepared by a process like that described in the example by substituting for acetic anhydride, equivalent amounts of propionic, butyric or isobutyric anhydrides, or a mixed anhydride of acetic and formic acid. Equivalent quantities of the salt forming acids can be substituted for hydrochloric acid in the final step of the synthesis to obtain the 4-hydroxybenzimidazole salts of these acids.

As diazo components, there can be employed the diazo compounds obtained from amines of the phenylene diamine series, particularly those in which one of the amino groups is substituted by an alkyl, hydroxyalkyl, cycloalkyl, aralkyl, aryl, or acyl group, and wherein the nucleus can be substituted by lower alkyl, halogen, and alkoxy groups. These include, for example, 4-monoethylamino-m-toluidine, p-amino-N-methylaniline, p-amino-N-ethyl-N-2′-hydroxyethylaniline, 4-amino - 2 - methoxy - N - cyclohexyl-aniline, p-amino-N-diethyl-m-toluidine, 3-aminocarbazole and 4-benzoylamino-2,5-diethoxyaniline. These compounds can be advantageously employed in the form of stable double salts or complex addition products of their diazonium halides such as the zinc chloride or tin chloride double salts, or the boron trifluoride addition products.

The sensitizing composition advantageously contains stabilizing acids such as formic, acetic, citric, tartaric, boric, mellitic, or sulfobenzoic acids; anti-oxidants such as thiourea; metal salts such as zinc chloride; wetting agents such as saponin; and water-soluble alcohols such as ethylene glycol, isopropanol, methanol or ethanol as penetrating agents, The sensitizing composition in aqueous solution can be applied to a suitable base such as paper, cloth, regenerated cellulose films, and plastic materials such as plastic-coated paper, cellulose esters or ethers, e. g. cellulose acetate foils. When applied to plastic surfaces, it is often advantageous to include a swelling agent for the plastic, e. g. $\gamma$-valerolactone, acetone and lower alcohols, in the sensitizing solution. After drying and exposure to light of varied intensity in accordance with an original to be reproduced, the image is developed preferably by exposure to an alkaline vapor such as ammonia or a lower volatile basic amine. Instead, development can also be effected by treatment with an aqueous alkaline solution such as aqueous sodium carbonate, trisodium phosphate, ammonia, or triethanolamine.

The unexposed photoprinting material produced in acordance with this invention possesses exceptional "shelf life," and stability to discoloration or premature coupling, while the copies produced therewith have outstanding fastness properties and stability against discoloration as well as excellent depth of shade.

Variations and modifications which will be obvious to those skilled in the art can be made in the details of the foregoing procedures without departing from the scope or nature of the invention.

I claim:

1. Diazotype photoprinting material having a light sensitive layer comprising a light sensitive diazo compound, and as an azo coupling component, a member of the group consisting of 4-hydroxybenzimidazole and 2-alkyl derivatives thereof in which the alkyl group contains 1–3 carbon atoms and salts thereof.

2. Diazotype photoprinting material having a light sensitive layer comprising a light sensitive diazo compound of the paraphenylenediamine series, and as an azo coupling component a salt of a 4-hydroxy-2-alkylbenzimidazole, wherein the alkyl group contains 1–3 carbon atoms.

3. Diazotype photoprinting material having a light sensitive layer comprising a light sensitive diazo compound of the paraphenylenediamine series, wherein one of the amino groups contains at least one substituent, and as an azo coupling component, a salt of 4-hydroxy-2-methylbenzimidazole.

4. Diazotype photoprinting material having a light sensitive layer comprising a light sensitive metal halide double salt of an N,N-diethylaminobenzene diazonium halide, and as the azo coupling component, the hydrochloride of 4-hydroxy-2-methylbenzimidazole.

FRED W. NEUMANN.

REFERENCES CITED

The following references are of record in the file of this patent:

UNITED STATES PATENTS

| Number | Name | Date |
|---|---|---|
| 2,150,565 | Schmidt et al. | Mar. 14, 1939 |
| 2,212,959 | Schmidt et al. | Aug. 27, 1940 |